(12) United States Patent
Quick, Jr.

(10) Patent No.: US 6,285,873 B1
(45) Date of Patent: Sep. 4, 2001

(54) METHOD FOR GENERATING A BROADCAST CHALLENGE VALUE

(75) Inventor: Roy F. Quick, Jr., San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/036,941

(22) Filed: Mar. 9, 1998

(51) Int. Cl.⁷ ...................................................... H04Q 7/20
(52) U.S. Cl. ........................ 455/422; 455/410; 455/411; 455/414; 455/415
(58) Field of Search ...................... 455/410, 411, 455/422, 412, 414, 415, 458, 461, 511, 515, 561, 419; 380/247, 248, 249

(56) References Cited

U.S. PATENT DOCUMENTS

| 4,845,491 | | 7/1989 | Fascenda et al. | 340/825.44 |
|---|---|---|---|---|
| 5,228,054 | | 7/1993 | Rueth et al. | 375/1 |
| 5,301,225 | | 4/1994 | Suzuki et al. | 379/59 |
| 5,347,580 | * | 9/1994 | Molva et al. | 380/25 |
| 5,363,448 | * | 11/1994 | Koopman, Jr. et al. | 380/25 |
| 5,377,183 | | 12/1994 | Dent | 370/18 |
| 5,382,949 | | 1/1995 | Mock et al. | 340/825.44 |
| 5,392,287 | | 2/1995 | Tiedemann, Jr. et al. | 370/95.1 |
| 5,392,452 | | 2/1995 | Davis | 455/38.1 |
| 5,398,021 | | 3/1995 | Moore | 340/825.27 |
| 5,450,071 | | 9/1995 | DeLuca et al. | 340/825.44 |
| 5,481,254 | | 1/1996 | Gaskill et al. | 340/825.52 |
| 5,485,463 | | 1/1996 | Godoroja | 370/95.1 |
| 5,491,718 | | 2/1996 | Gould et al. | 375/205 |
| 5,506,796 | * | 4/1996 | Ishida | 364/717 |
| 5,511,067 | | 4/1996 | Miller | 370/18 |
| 5,511,110 | | 4/1996 | Drucker | 379/57 |
| 5,537,097 | | 7/1996 | Ericksson et al. | 340/825.52 |
| 5,544,223 | | 8/1996 | Robbins et al. | 379/58 |
| 5,717,830 | * | 2/1998 | Sigler et al. | 455/426 |
| 5,778,316 | * | 7/1998 | Persson et al. | 455/434 |
| 5,878,339 | * | 3/1999 | Zicker et al. | 455/419 |
| 5,943,425 | * | 8/1999 | Mizikovsky | 380/25 |
| 5,943,615 | * | 8/1999 | Rose et al. | 455/411 |
| 6,035,039 | * | 3/2000 | Tsidale et al. | 380/23 |
| 6,112,083 | * | 8/2000 | Sweet et al. | 455/426 |

* cited by examiner

Primary Examiner—Daniel Hunter
Assistant Examiner—Yemane Woldetatios
(74) Attorney, Agent, or Firm—Philip R. Wadworth; Thomas R. Rouse

(57) ABSTRACT

A method for generating a broadcast challenge value includes the steps of applying a first updating algorithm to the most significant bits of the broadcast challenge value, and applying a second, distinct updating algorithm to the least significant bits of the broadcast challenge value. The updating algorithms can be maximal-length shift registers or other forms of pseudorandom noise generator. The sequence of successive unrepeated values can be extended for either one or both sets of bits by inserting an all-zeroes value once during the period of time before which an update value recurs. System-wide synchronization can be achieved via a global time reference.

58 Claims, 7 Drawing Sheets

METHOD FOR GENERATING A BROADCAST CHALLENGE VALUE

BACKGROUND OF THE INVENTION

I. Field of the Invention

The present invention pertains generally to the field of wireless communications, and more particularly to generation of a broadcast challenge value in a cellular base station.

II. Background

The field of wireless communications has many applications including, e.g., cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, ANSI J-STD-008, etc. (referred to collectively herein as IS-95), are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459, which is assigned to the assignee of the present invention and fully incorporated herein by reference. The aforesaid patent illustrates transmit, or forward-link, signal processing in a CDMA base station. Exemplary receive, or reverse-link, signal processing in a CDMA base station is described in U.S. application Ser. No. 08/987,172, filed Dec. 9, 1997, entitled MULTICHANNEL DEMODULATOR, which is assigned to the assignee of the present invention and fully incorporated herein by reference. In CDMA systems, power control is a critical issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same RF band. For example, each mobile subscriber unit (typically a cellular telephone) in a given cellular telephone system can communicate with the same base station by transmitting a reverse link signal over the same 1.25 MHz of RF spectrum. Similarly, each base station in such a system can communicate with mobile units by transmitting a forward link signal over another 1.25 MHz of RF spectrum.

Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit from the coverage area of two or more base stations that involves simultaneously interfacing with two base stations. (In contrast, hard handoff involves terminating the interface with a first base station before establishing the interface with a second base station.) An exemplary method of performing soft handoff is described in U.S. Pat. No. 5,267,261, which is assigned to the assignee of the present invention and fully incorporated herein by reference.

As understood by those of skill in the art, CDMA technology can be applied to wireless local loop systems and satellite communication systems in addition to cellular systems.

In cellular telephone systems generally, mobile subscriber units, or mobile stations, must be authenticated by the base station prior to being allowed access to services such as telephone connections. Cellular communications standards typically define procedures for authentication of mobile stations using service provided by the cellular infrastructure (base stations and/or base station controllers). Cellular standards published by the TIA provide two methods for authenticating mobile stations. The methods are called the "unique challenge" method and the "broadcast challenge" method. TIA standards using these methods include IS-91 (an AMPS standard), IS-54 (a TDMA standard defining analog control channels), IS-136 (a TDMA standard defining digital control channels), and IS-95.

The unique challenge method is well known to those of skill in the art. Under the unique challenge method, the cellular infrastructure equipment sends a challenge value to a mobile station, and the mobile station sends back a response that is computed from the challenge, the mobile station identifier, and secret data known only to the base station and the legitimate mobile station having the particular identifier. If the response is correct, the cellular infrastructure provides access to services such as telephone connections. The unique challenge has the disadvantage that the time required to complete the challenge-response process can be relatively long and can unduly delay call setup. For this reason, the broadcast challenge method has been included in TIA cellular standards as a means of providing rapid authentication of requests for access to cellular services.

Under the broadcast challenge method, the challenge value (typically denoted "RAND") is broadcast on cellular control channels. A mobile station that requests access to cellular services uses the broadcast challenge value in computing a response to the challenge, the response being computed using the challenge, the mobile station identifier, and secret information known only to the base station and the mobile station with that identifier. The mobile station includes the response in its request for service.

The broadcast method can be subject to "replay" attacks in which a fraudulent mobile station monitors the communications from legitimate mobile stations and reuses both the identifier for the legitimate mobile station and the response of that station to the broadcast challenge. There exists various known methods for thwarting the replay attack. Nevertheless, a primary conventional means of thwarting replay attacks is to change the broadcast challenge value frequently. If the broadcast challenge value is changed with an update interval comparable to the duration of a typical telephone call, then replay attacks can be thwarted simply by denying accesses that appear to come from the same mobile station while a call is already in progress from that mobile station. At present, the expected duration of a cellular telephone call is approximately one minute.

However, such frequent changes of RAND can be difficult for centrally managed infrastructure equipment because the RAND value is transmitted from a large number of cell sites, and all equipment in all cell sites must be updated in order to change RAND. This places a substantial communication burden on the internal control system of the cellular infrastructure. Additionally, the updating of RAND requires that the mobile station identify which value of RAND was used to compute the response. As the mobile station may have begun its access just as an update of RAND began, it is possible for the mobile station to use the previous value of RAND rather than the updated value. Therefore, it is desirable that the cellular infrastructure not compute and accept responses for all recent values of RAND because the computation of the expected response can be slow, and because this decreases the effectiveness of RAND by increasing the likelihood that a randomly chosen response might succeed.

However, it is desirable to minimize the number of bits that must be sent on the air interface to conserve bandwidth and enhance the robustness of signaling transmission. Therefore, TIA standards for mobile station access requests typically do not include the complete value of RAND in the access request. Instead, only the most significant part of RAND is sent in the access request, thereby using a smaller number of bits to identify which RAND value was used. In TIA standards the most significant eight bits of RAND (denoted "RANDC") are used. However, this technique succeeds only if the most significant bits of RAND change each time RAND is updated. It is therefore a requirement that the RAND updating process be carried out in such a way that RANDC is distinct for each new value of RAND.

In TIA standards, RAND is typically thirty-two bits in length (bits 0 through 31), with the most significant eight bits (bits 24 through 31) being referred to as RANDC. The mobile station returns RANDC, along with its response to RAND, in access request messages. The base station must maintain a list of valid RAND values and determine, using only RANDC, which RAND value was used to compute the response returned by the mobile station. It is therefore required that all recently used RAND values have unique values of RANDC.

In addition to the above considerations pertinent to selecting RAND values, it is desirable for security reasons to maximize the period of time before a value of RAND is reused, thereby forcing a long wait before an authentication signature can be replayed. This suggests that it is not, in fact, desirable to use a truly random number for RAND. Instead, it would be desirable to use a deterministic algorithm that ensures the maximum cycle for the possible values of RAND.

Further, in most cellular systems it is disallowed to have a value of zero for RANDC because the zero value is used by the mobile station to indicate that it does not have a current value of RAND and has used all zeroes to compute the response. Hence, a characteristic of the RAND update process should be to ensure that RANDC is distinct and nonzero for each update.

Additionally, it is desirable to have successive values of RAND be as different as possible to minimize the likelihood of success for differential attacks on the response generation process. This suggests that simple, counter-based schemes are insufficient, and that updating methods with low correlation between successive values are preferable.

Finally, it is desirable to minimize messaging within the interconnection network in the cellular system by decentralizing the computation of new RAND values.

Thus, there is a need for a generation method that minimizes the correlation between successive RAND values, ensures maximum periodicity for both RAND and RANDC, and allows every cell site to perform identical updates without messaging from a central control device to trigger the update process.

SUMMARY OF THE INVENTION

The present invention is directed to a generation method that minimizes the correlation between successive RAND values, ensures maximum periodicity for both RAND and RANDC, and allows every cell site to perform identical updates without messaging from a central control device to trigger the update process. Accordingly, a method for generating a broadcast challenge value includes the steps of applying a first updating algorithm to the most significant bits of a binary number and operating on the least significant bits of the binary number with a second updating algorithm. Advantageously, the updating algorithms simulate distinct, maximal-length shift registers. Preferably, an all-zeroes value is inserted as an update for either set of bits once during the period of time necessary for the sequence of updates to produce a repeat value.

In a first aspect of the invention, a binary number is updated with maximum periodicity and minimum correlation between successive updates. The updates are advantageously performed by distinct algorithms operating on separate parts of the binary number.

In a second, separate aspect of the invention, a binary number is updated synchronously across all of the base stations in a cellular system. Preferably, the updates are synchronized with a system-wide time clock reference signal.

DETAILED DESCRIPTION OF THE PREFERRED EMBODIMENTS

A RAND generation method embodying features of the instant invention may reside in any of various cellular telephone systems as understood by those of skill in the art. Such cellular systems include, e.g., AMPS (analog), IS-54 (North American TDMA), GSM (Global System for Mobile communications TDMA), and IS-95 (CDMA). In a preferred embodiment, the cellular system is a CDMA system.

Figure 1:
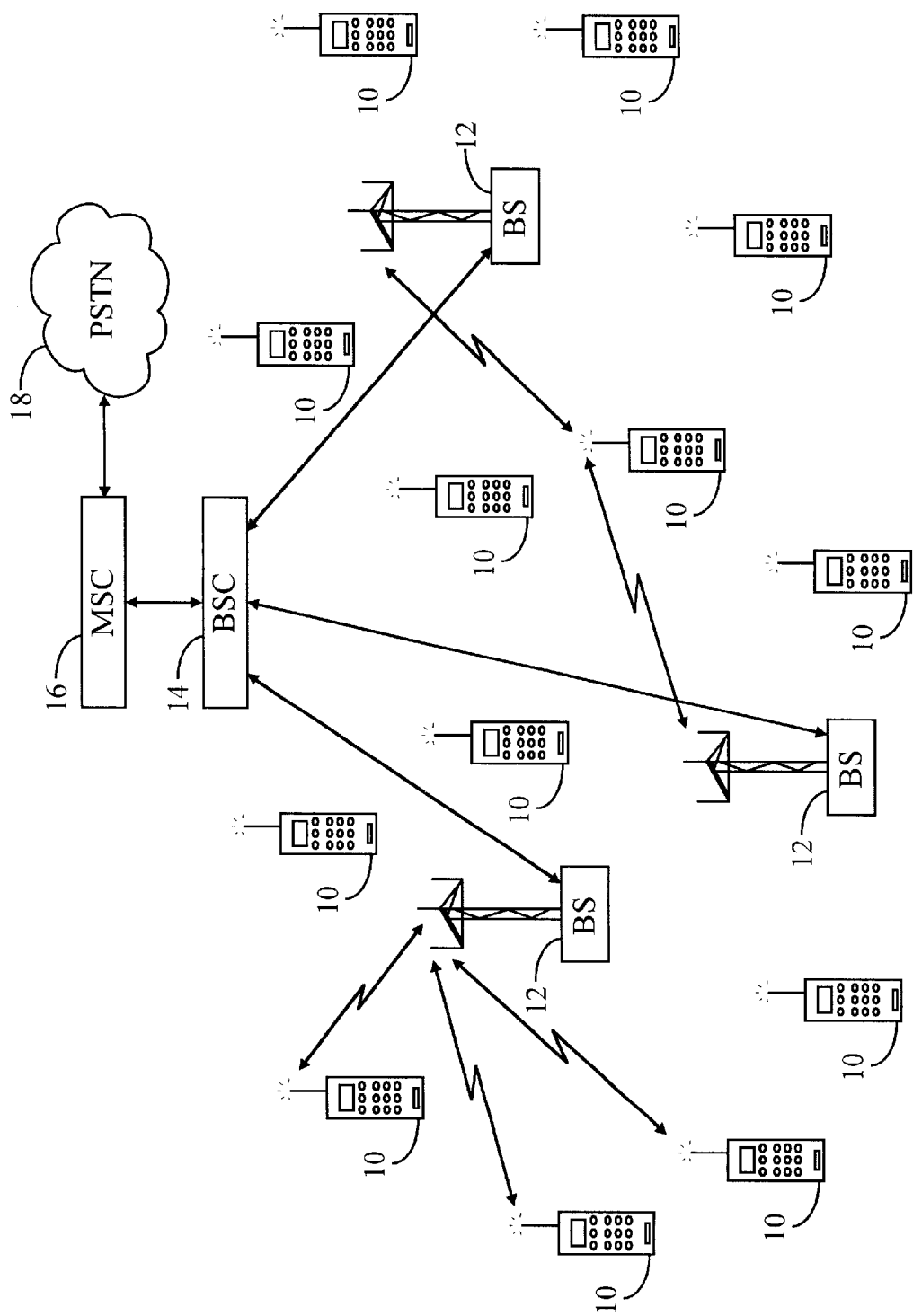
FIG. 1 is a block diagram of a cellular telephone system.

As illustrated in FIG. 1, a CDMA wireless telephone system generally includes a plurality of mobile subscriber units 10, a plurality of base stations 12, a base station controller (BSC) 14, and a mobile switching center (MSC) 16. The MSC 16 is configured to interface with a conventional public switch telephone network (PSTN) 18. The MSC 16 is also configured to interface with the BSC 14. The BSC 14 is coupled to each base station 12. The base stations 12 may also be known as base station transceiver subsystems (BTSs) 12. Alternatively, "base station" may be used in the industry to refer collectively to a BSC 14 and one or more BTSs 12, which BTSs 12 may also be denoted "cell sites" 12. (Alternatively, sectors of a given BTS 12 may be referred to as cell sites.) The mobile subscriber units 10 are typically cellular telephones 10, and the cellular telephone system is advantageously a CDMA system configured for use in accordance with the IS-95 standard.

During typical operation of the cellular telephone system, the base stations 12 receive sets of reverse link signals from sets of mobile units 10. The mobile units 10 are conducting telephone calls or other communications. Each reverse link signal received by a given base station 12 is processed within that base station 12. The resulting data is forwarded to the BSC 14. The BSC 14 provides call resource allocation and mobility management functionality including the orchestration of soft handoffs between base stations 12. The BSC 14 also routes the received data to the MSC 16, which provides additional routing services for interface with the PSTN 18. Similarly, the PSTN 18 interfaces with the MSC 16, and the MSC 16 interfaces with the BSC 14, which in turn controls the base stations 12 to transmit sets of forward link signals to sets of mobile units 10.

In the CDMA system of FIG. 1, each base station 12 includes at least one sector (not shown), each sector comprising an antenna pointed in a particular direction radially away from the base station 12. Preferably, each base station 12 includes three sectors, and the radial directions each sector antenna points differ by 120 degrees.

Advantageously, maximal-length shift registers or software simulations thereof can be used by the base stations 12 to generate new broadcast challenge values, or update RAND. In a preferred embodiment, Galois shift registers are used as maximal-length shift registers. Other implementations of maximal-length shift registers, such as, e.g., linear feedback shift registers (LFSRs), could be substituted for the Galois shift registers, as known in the art.

Figure 2:
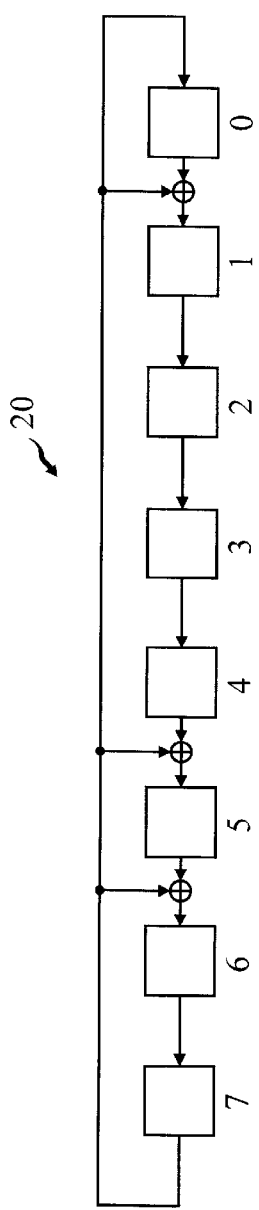
FIG. 2 is a block diagram of a Galois shift register.

As understood by those of skill in the art, a Galois shift register shifts each bit one position to the left with each clock pulse, with predetermined bits being exclusive-OR'd (XOR'd) with a feedback tap bit. Thus, as shown in FIG. 2, an 8-bit Galois shift register 20 includes feedback taps after bit positions 0, 4, and 5. Upon each shift left, bit position 1 receives the exclusive-OR result of bit 7 and bit 0. Similarly, bit position 5 receives the exclusive-OR result of bit 7 and bit 4, and bit position 6 receives the exclusive-OR result of bit 7 and bit 5.

Figure 3:
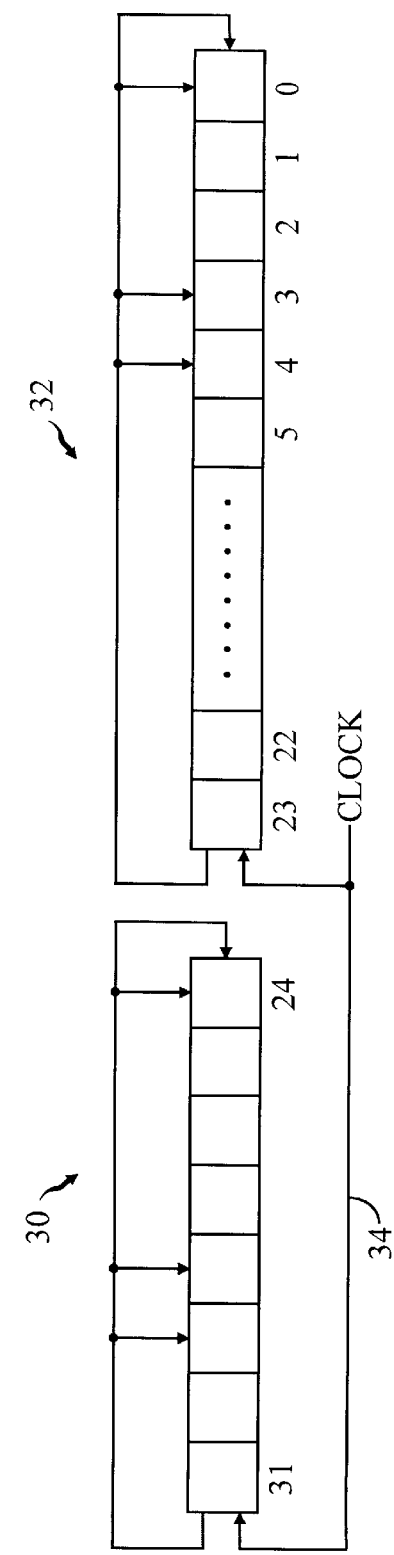
FIG. 3 is a block diagram of two Galois shift registers.

In a particular embodiment, depicted in FIG. 3, a RAND update method relies on first and second Galois shift registers 30, 32. A single update clock signal 34 causes an update of the two shift registers 30, 32. The first shift register 30 is an 8-bit shift register 30 used to determine successive values of RANDC. The second shift register 32 is a 24-bit shift register 32 used to determine successive values of the remaining bits of RAND. The first and second shift registers 30, 32 are both coupled to the same clock signal 34, but are otherwise unconnected. Hence, RANDC is advantageously generated separately from the remainder of RAND.

In the embodiment shown, the first and second shift registers 30, 32 each have feedback taps, or electrical connections, applied to particular bit locations in the registers 30, 32. It is understood by those of skill in the art that any primitive polynomials of order eight and twenty-four can be used to determine, respectively, the feedback taps of the first and second shift registers 30, 32. In the specific embodiment shown, the primitive polynomials for the first and second shift registers 30, 32 are, respectively, $x^8+x^6+x^5+x+1$ and $x^{24}+x^4+x^3+x+1$.

Provided each shift register 30, 32 is initialized to a nonzero value, the values each shift register 30, 32 generates will always be nonzero. Advantageously, this satisfies the constraint that RANDC be nonzero. However, this arrangement does not maximize the length of the sequence of RAND values because the two shift registers 30, 32 each produce sequences of lengths that are not relatively prime, i.e., $2^8-1=255 = 3*5*17$ and $2^{24}-1 = 16777215 = 3*3*5*7*13*17*241$. Thus, the sequence of RAND values produced by this arrangement is only 65793 in length, which is only slightly more than would be produced by a single, 16-bit shift register.

Because a maximal-length sequence does not include an all-zeroes value, the length of the sequence of RAND values can be extended by inserting an all-zeroes value. Hence, an all-zeroes value of the 24-bit shift register 32 may advantageously be inserted at any point in the sequence, thereby increasing the length of the sequence of 24-bit values to 16777216, which is a power of 2 and is therefore relatively prime to 255, the length of the RANDC sequence. This advantageously lengthens the sequence of RAND values to $255*16777216$, which is equal to $2^{32}-2^{24}$. This is the maximum possible sequence length given that RANDC must be nonzero.

Figure 4:
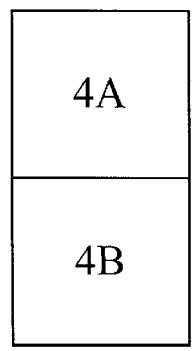
FIG. 4 is a flowchart of a RAND update method.

The flowchart of FIG. 4 illustrates a RAND update method in accordance with a particular embodiment in which first and second Galois shift registers (corresponding to RANDC and the remaining RAND bits, denoted RANDL) are simulated with computer software. The method of FIG. 4, which advantageously inserts a value of all zeroes into the sequence produced by the simulated, 24-bit RANDL Galois shift register, can be implemented with any conventional source code including, e.g., C code or C++ code, as understood by those of skill in the art. Cell sites typically include integrated circuits, which are advantageously Application Specific Integrated Circuits (ASICs), with processors running software.

In step 40 the algorithm computes the AND result of an 8-digit hexadecimal (32-bit binary) number called "INIT" and the 8-digit hexadecimal value 00FFFFFF. This computation determines whether the twenty-four least significant bits of INIT are all 0s. If the least significant twenty-four bits of INIT are all 0s, the algorithm proceeds to step 42. Otherwise, the algorithm proceeds to step 44.

In step 42 INIT is set equal to the OR result of INIT and 1. This step gives the least significant bit of INIT a value of 1. Steps 40 and 42 ensure that the register is initialized to a nonzero value, forcing the register to one if it is zero at the start. The algorithm then proceeds to step 44. In step 44 the algorithm calculates the AND result of INIT and the hexadecimal value 00FFFFFF. This result is called "PREINIT." Thus, PREINIT is a 32-bit binary number whose most significant eight bits are 0s. After giving the above value to PREINIT, the algorithm proceeds to step 46.

In step 46 the AND result of PREINIT and 1 is determined. This allows the algorithm to check whether the least significant bit of PREINIT is 1. If the AND result of PREINIT and 1 is not 0, the algorithm proceeds to step 48. If the AND result of PREINIT and 1 is 0, the algorithm proceeds to step 50.

In step 48 the algorithm computes the exclusive-OR (XOR) result of PREINIT and the 8-digit hexadecimal number 0100001B. The XOR result of PREINIT and 0100001B is then made the new value of PREINIT. The algorithm then proceeds to step 50. In step 50 the PREINIT value is shifted to the right by one bit position, i.e., to the value that the register would have one clock pulse earlier in time. The algorithm then proceeds to step 52. Steps 48 and 50 effectively simulate in reverse order the Galois shift register functions for RANDL. Thus, the twenty-four least significant bits of PREINIT have first been XOR'd with a binary value of nineteen 0s followed by the sequence 11011 (i.e., the hexadecimal digits 00001B, which are the last six digits of the hexadecimal number 0100001B), and the twenty-fifth bit is set to 1. The sequence 11011 simulates feedback taps at bit positions 0, 1, 3, and 4. Afterward, with the next instruction, the simulated shift register is shifted to the right by one bit position, thereby shifting the twenty-fifth bit down into the twenty-fourth bit position. (In contrast, as described in connection with FIG. 2, the Galois shift register performs a shift left and XORs the feedback tap bits.)

In step 52 the AND result of the 32-bit binary RAND value and the 32-bit binary number 00FFFFFF is obtained. This AND result is called "LSMASK." This computation makes LSMASK equal to eight 0s followed by the twenty-four bits of RANDL (the twenty-four least significant bits of RAND). The algorithm then proceeds to step 54.

In step 54 the algorithm checks whether LSMASK equals 0, i.e., whether the least significant twenty-four bits of LSMASK (which constitute RANDL) are all 0s. If LSMASK equals 0, the algorithm proceeds to step 56. Otherwise, the algorithm proceeds to step 58.

In step 56 the OR result of RAND and PREINIT is obtained and made the new value of RAND. Thus, RAND becomes eight 0s followed by the twenty-four least significant bits of PREINIT (i.e., RANDC is 0, and RANDL is the twenty-four least significant bits of PREINIT). The algorithm then proceeds to step 62.

In step 58 the algorithm checks whether LSMASK is equal to PREINIT. If LSMASK is not equal to PREINIT, the algorithm proceeds to step 62. If, on the other hand, LSMASK and PREINIT are the same, the algorithm proceeds to step 60. In step 60 the AND result of RAND and the 8-digit hexadecimal number FF000000 (eight is followed by twenty-four 0s) is computed and made the new value of RAND. Thus, RAND becomes RANDC followed by twenty-four 0s (i.e., RANDL is 0). The algorithm then proceeds to step 62.

In step 62 a value called "MASK" is set equal to 0. The algorithm then proceeds to step 64.

In step 64 the algorithm calculates the AND result of RAND and the 8-digit hexadecimal number 80000000 (a 1 followed by thirty-one 0s). The algorithm then checks whether this AND result is not equal to 0. In other words the algorithm determines whether the most significant bit of RAND is 1. If this AND result is determined not to be 0, the algorithm proceeds to step 66. If, however, the AND result is found to be 0, the algorithm proceeds to step 68.

In step 66 MASK is given the 8-digit hexadecimal value 63000000. (RANDC is defined as an 8-bit register with a primitive polynomial of 0x163, i.e., binary 101100011, or primitive polynomial $x^8+x^6+x^5+x+1$, as discussed above. The MASK value need not be 163000000, however, because the most significant bit is off the end of the simulated RANDC register.) The algorithm then proceeds to step 68. In step 68 the algorithm computes the AND result of RAND and the 8-digit hexadecimal number 00800000 (eight 0s followed by a 1 followed by twenty-three 0s). The algorithm then checks whether this AND result is not equal to 0. In other words the algorithm determines whether the most significant bit of RANDL is 1. If this AND result is determined not to be 0, the algorithm proceeds to step 70. If, however, the AND result is found to be 0, the algorithm proceeds to step 72. In step 70 the XOR result of MASK and the 8-digit hexadecimal number 0100001B is obtained and made the new value of MASK. It can be appreciated that this XOR result yields a MASK value for the 24-bit RANDL simulated register of polynomial $x^{24}+x^4+x^3+x+1$ (0x0100001B), as discussed above. The algorithm then proceeds to step 72.

In step 72 RAND is shifted left by one bit position. The algorithm then proceeds to step 74. In step 74 the algorithm calculates the XOR result of RAND and MASK. This XOR result is made the new value of RAND. The algorithm then proceeds to step 76. In step 76 the algorithm returns the RAND value derived in step 74 as the updated value of RAND.

Thus, in the method described in connection with FIG. 4, RANDC is defined as an 8-bit Galois shift register with a primitive polynomial of 0x163, and RANDL is defined as a 24-bit Galois shift register with a primitive polynomial of 0x0100001B. A value of 0 is inserted just prior to INIT, which is generally not equal to 0x00000001, so that the period is increased to 224, making the period prime relative to 255, the period of RANDC. The two simulated Galois shift registers have different feedback taps (because they have different primitive polynomials) and therefore advantageously constitute separate and distinct algorithms.

It can be seen that the method depicted in FIG. 4 for generating RAND updates is advantageously simple enough to be performed anywhere in the infrastructure of a cellular system. In a specific embodiment, the method can be performed in the cell sites (not shown) of the CDMA cellular system of FIG. 1, thereby eliminating the need to create new RAND values centrally and distribute them to the cell sites for broadcast.

It is possible to have the cell sites update RAND periodically without synchronization, performing local reconstruction of RAND from RANDC. However, this would be undesirable from the standpoint of security because it would effectively reduce the length of the sequence of RAND values. Namely, although a given cell site would produce the maximum-length sequence of RAND values, a neighboring cell site, producing values asynchronously, would repeat one of the first cell site's RAND values sooner than would the first cell site. In a worst-case scenario, the neighboring cell site would be only a few RAND values behind, allowing replays to be easily performed from one cell site to the other.

Nevertheless, such inter-cell-site replay attacks may advantageously be prevented by synchronizing RAND updates across all cell sites in such a way that all RAND values are the same at any given time. In a specific embodiment, a global time clock is used to accomplish this synchronization. Such a global time clock is readily available in, e.g., the CDMA system described in TIA standard IS-95, as all cell sites must already produce CDMA spreading sequences that are synchronized within ten microseconds. The IS-35 95 CDMA standard defines a global "system time" that is coordinated to the time reference of the Global Positioning System (GPS). It is evident to those of skill in the art that any similar method of coordinating the time reference between cell sites could be used.

The existence of a global, or system-wide, time reference available to all cell sites, or base stations, renders it possible to ensure that all cell sites use the same RAND. Each cell site can set its RAND value during cell-site initialization by computing the number of updates that have occurred since a reference time and determining the value of RAND that results from that number of updates. In the CDMA system of FIG. 1, for example, system time is defined to be zero at the same time GPS time is defined to be zero, i.e., midnight, Jan. 6, 1980.

Figure 5:
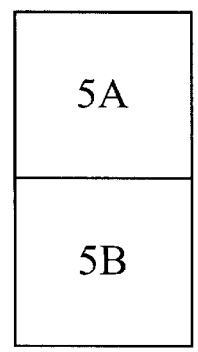
FIG. 5 is a flowchart of a method for computing a current RAND value.
Figure 4A:
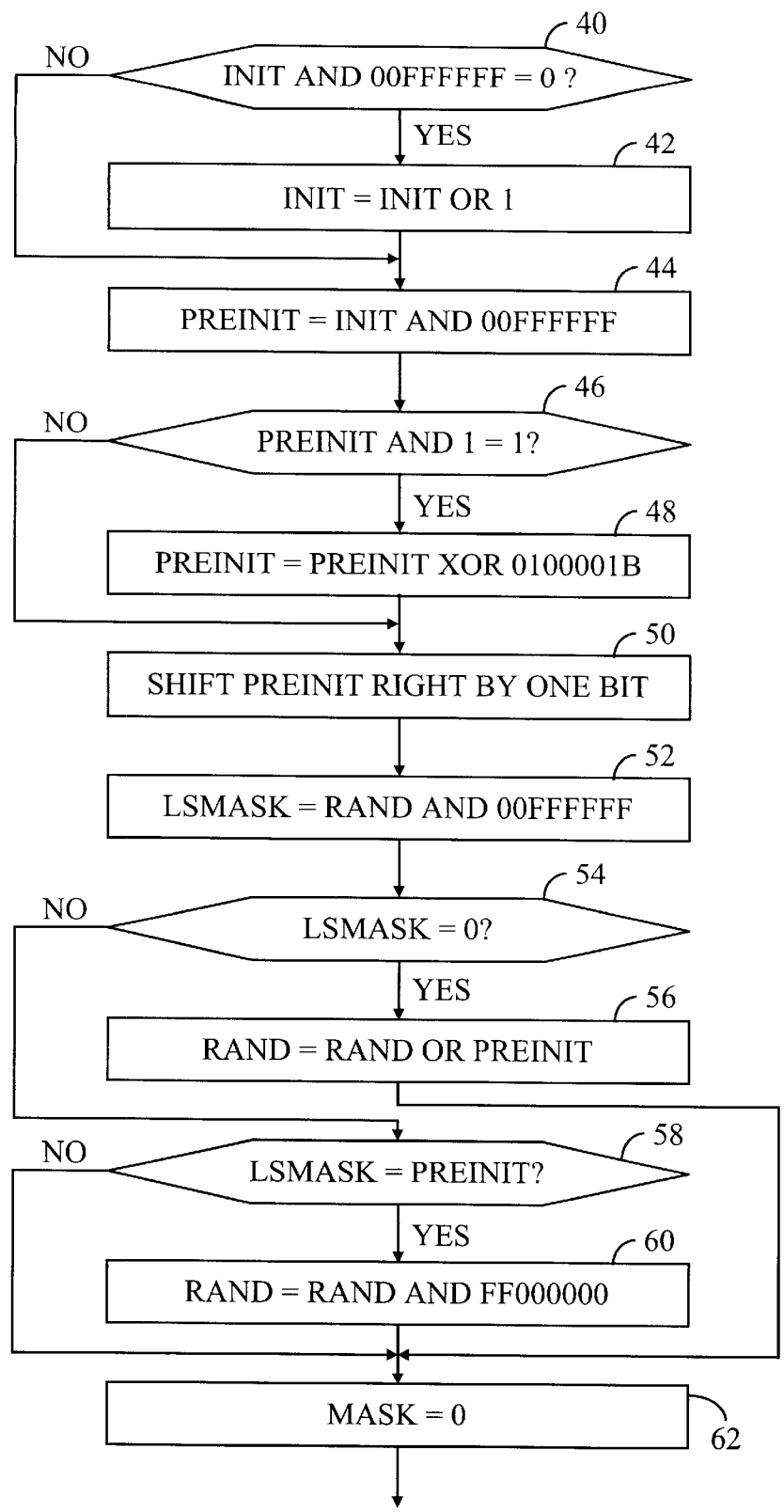
Figure 4B:
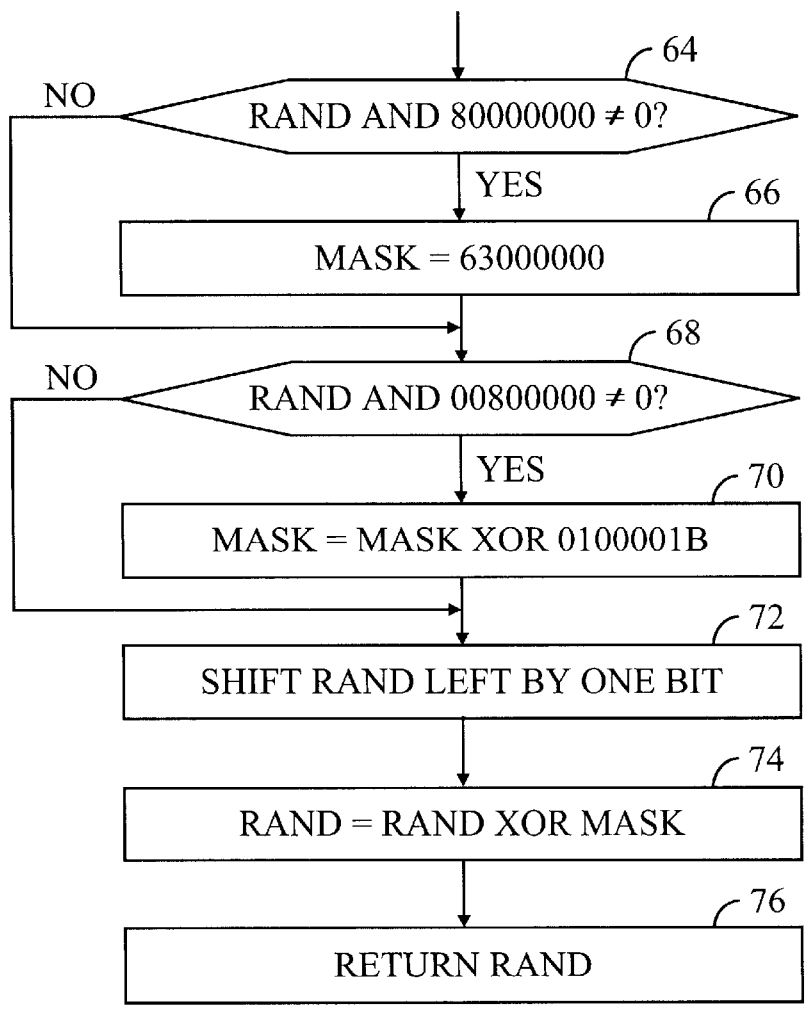
Figure 5A:
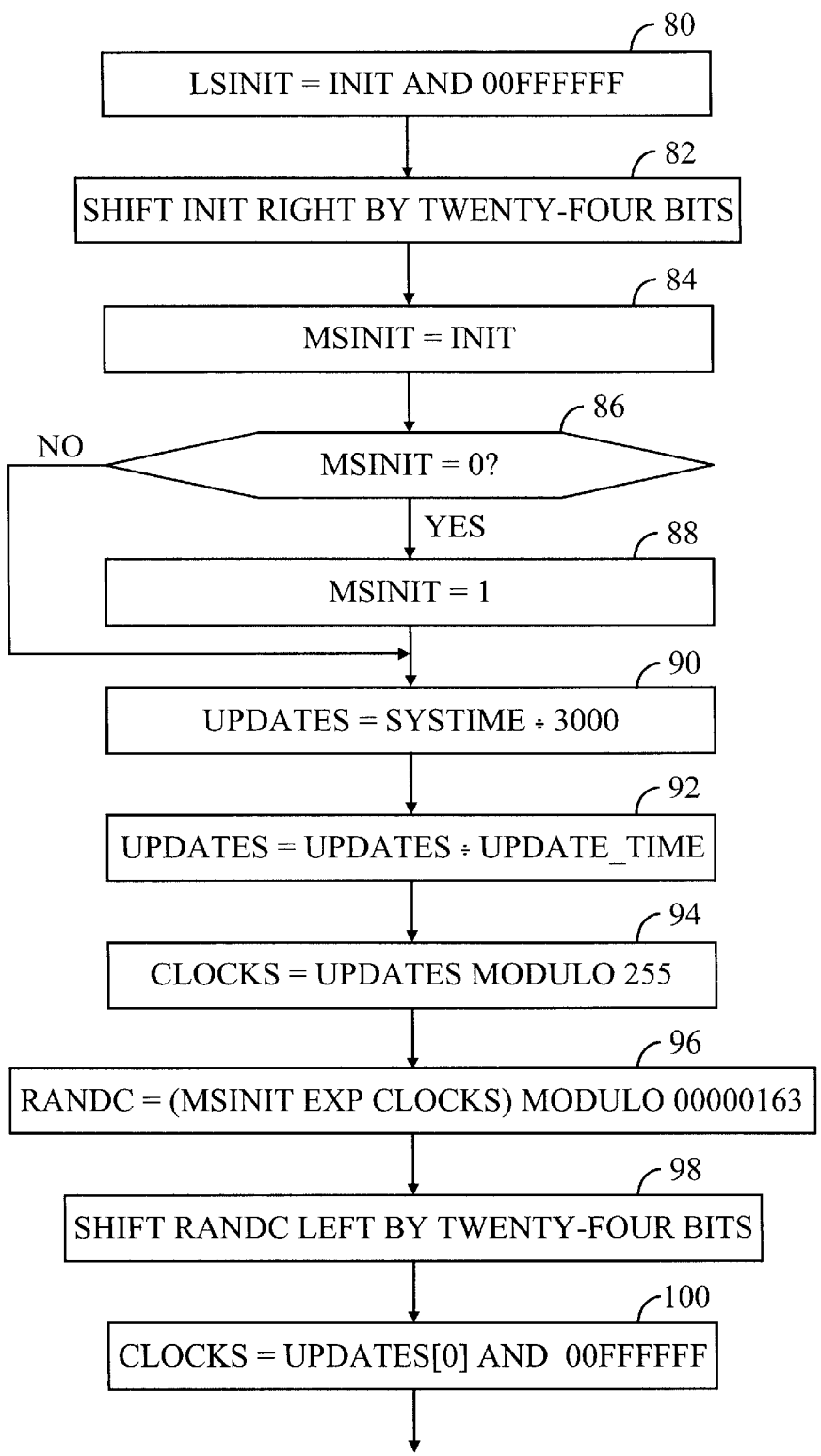
Figure 5B:
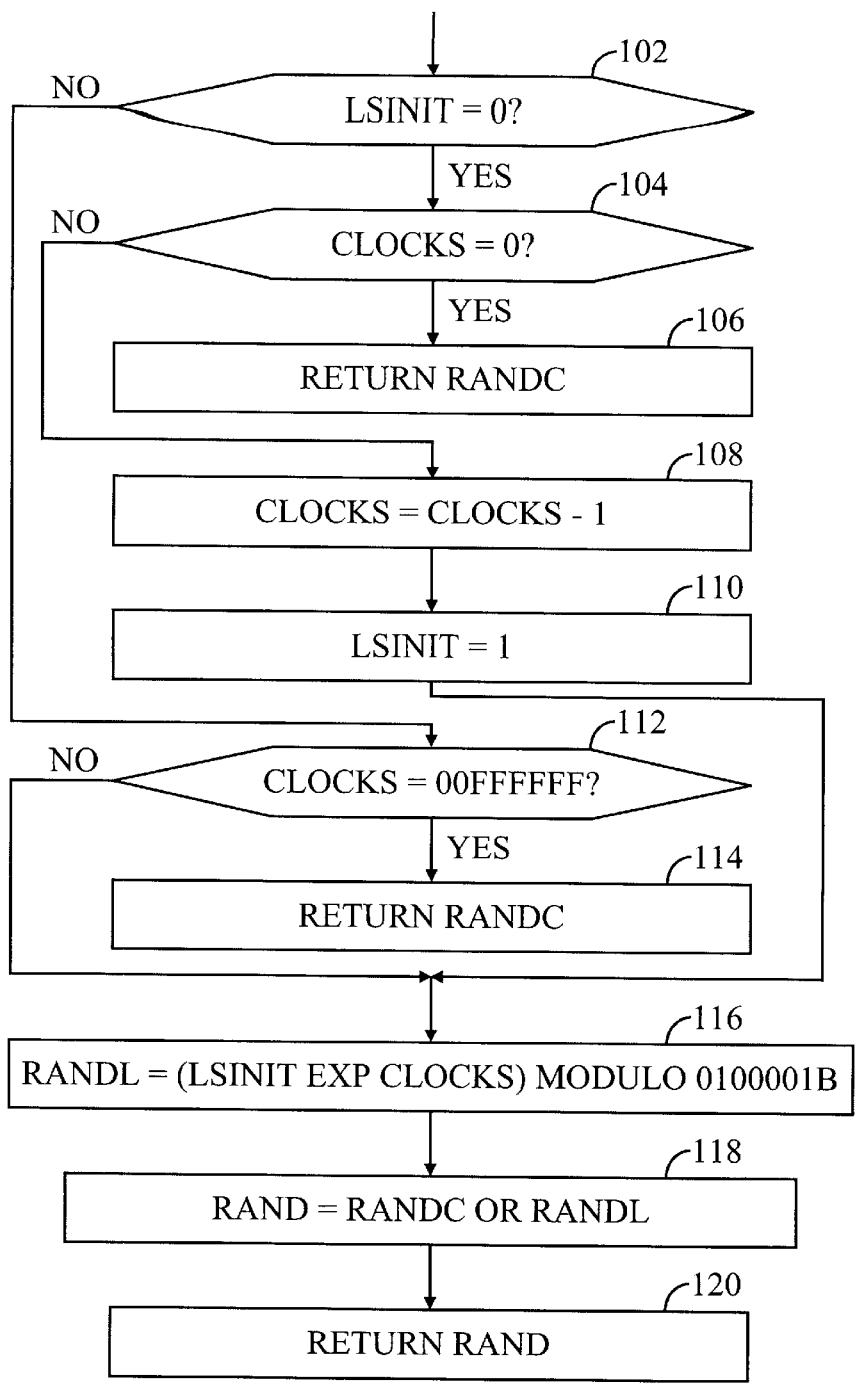

The current value of RAND can be derived in accordance with a particular embodiment described by the flowchart of FIG. 5, which can be implemented with any conventional source code including, e.g., C code or C++ code, as understood by those of skill in the art. Cell sites typically include integrated circuits, which are advantageously Application Specific Integrated Circuits (ASICs), with processors running software. The method illustrated in FIG. 5 advantageously uses the properties of software-simulated Galois shift registers to compute their current values without clocking, thereby avoiding computational inefficiency in reaching the current value of RAND.

In the embodiment described in connection with FIG. 5, a 64-bit field called "SYSTIME" represents the current system time in number of frames since the start of the system. A 32-bit field called "UPDATE_TIME" denotes the number of minutes per RAND update interval. Thus, RAND updates occur when system time in minutes is zero modulo UPDATE_TIME. The 32-bit field "INIT" gives the initial value of RAND at system startup. As described above, RANDC represents the eight most significant bits of RAND, and RANDL denotes the twenty-four least significant bits of RAND (RAND is a 32-bit binary number). Preferably, a CDMA system as described in connection with FIG. 1 is used whereby the frame rate is defined as 20 msec per frame, or 3000 frames per minute, and the start of system time is defined as midnight of Jan. 6, 1980.

In step 80 the algorithm determines the AND result of INIT and the hexadecimal number 00FFFFFF. This AND result is assigned to a 32-bit variable called "LSINIT," so that LSINIT equals eight 0s followed by the twenty-four least significant bits of IMT. The algorithm then proceeds to step 82. In step 82 INIT is shifted to the right by twenty-four bit positions. The algorithm then proceeds to step 84. In step 84 the value of INIT is assigned to a 32-bit variable called "MSINIT," so that MSINIT equals twenty-four 0s followed by the eight most significant bits of INIT. The algorithm then proceeds to step 86. In step 86 the algorithm checks whether MSINIT equals 0. If MSINIT equals 0, the algorithm proceeds to step 88. Otherwise, the algorithm proceeds to step 90. In step 88 the algorithm sets the least significant bit of MSINIT equal to 1. The algorithm then proceeds to step 90. Thus, in steps 80 through 88, the algorithm has determined the initial values of RANDC and RANDL.

In step 90 the algorithm divides SYSTIME by a 32-bit binary field representing the number 3000. The resultant quotient is assigned to a 64-bit variable called "UPDATES." Thus, the algorithm has converted system time in frames to system time in minutes by dividing the number of frames since system startup by the frame rate of 3000 frames per minute. The algorithm next proceeds to step 92.

In step 92 the algorithm divides UPDATES by UPDATE_TIME. UPDATES is then set equal to the resultant quotient. Thus, the algorithm has calculated the number of RAND updates since system startup by dividing the number of minutes since system startup by the number of minutes per RAND update. The algorithm next proceeds to step 94.

In step 94 UPDATES is divided by a 32-bit binary field representing the number 255, yielding a quotient and a remainder. The quotient is discarded and the remainder is assigned to a 32-bit variable called "CLOCKS." As described above, the number 255 is the period of RANDC (the number of times RANDC changes before repeating itself). The algorithm then proceeds to step 96.

In step 96 MSINIT is raised to the power of CLOCKS, and the result is divided, using polynomial long division, by the hexadecimal number 00000163 (the primitive polynomial for RANDC). The resultant quotient is discarded while the remainder is called RANDC. The algorithm then proceeds to step 98. In step 98 RANDC is shifted to the left by twenty-four bit positions, yielding a 32-bit binary number equal to RANDC followed by twenty-four 0s. The algorithm then proceeds to step 100.

In step 100 the AND result of the thirty-two least significant bits of UPDATES (i.e., UPDATES[0]) and the hexadecimal number 00FFFFFF is obtained. CLOCKS is set equal to this AND result. This step effectively calculates the remainder of UPDATES divided by 224 (the period of RANDL with zero insertion is 224). The algorithm then proceeds to step 102.

In step 102 the algorithm checks whether LSINIT equals 0. If LSINIT equals 0, the algorithm proceeds to step 104. Otherwise, the algorithm goes directly to step 112. In step 104 the algorithm checks whether CLOCKS equals 0. If CLOCKS equals 0, the algorithm proceeds to step 106. Otherwise, the algorithm proceeds to step 108. In step 106 the algorithm returns the value of RANDC for RAND, as RANDL is 0. In step 108 CLOCKS is set equal to the difference CLOCKS minus 1, thereby decrementing the value of CLOCKS by 1. The algorithm then proceeds to step 110. In step 110 the least significant bit of LSINIT is set equal to 1. The algorithm then goes directly to step 116. Steps 104 through 110 are needed because if the current RAND update is taking place at the start of the cycle, the least significant part of RAND (RANDL) is 0.

In step 112 the algorithm checks whether CLOCKS is equal to the hexadecimal number 00FFFFFF. If CLOCKS is equal to 00FFFFFF, the algorithm proceeds to step 114. Otherwise, the algorithm proceeds to step 116. In step 114 the algorithm returns the value of RANDC for RAND, as RANDL is 0. Steps 112 and 114 are needed because if the current RAND update is taking place at the end of the cycle, the least significant part of RAND (RANDL) is 0.

In step 116 LSINIT is raised to the power of CLOCKS, and the result is divided, using polynomial long division, by the hexadecimal number 0100001B (the primitive polynomial for RANDL). The resultant quotient is discarded while the remainder is called RANDL. The algorithm then proceeds to step 118.

In step 118 the algorithm computes the OR result of RANDC and RANDL. This OR result is assigned to the 32-bit variable RAND. Namely, the eight most significant bits of RAND are equal to the OR result of RANDC and eight 0s, i.e., RANDC, and the twenty-four least significant bits of RAND are equal to the OR result of twenty-four 0s and RANDL, i.e., RANDL. The algorithm then proceeds to step 120. In step 120 the algorithm returns the RAND value of step 118 as the next updated value of RAND.

Thus, in accordance with the embodiment of FIG. 5, the algorithm determines the current value of RAND given current system time and the RAND update period in minutes. In accordance with the embodiment of FIG. 4, the algorithm treats the parts of RAND as Galois shift registers, so the register contents can be treated as polynomials in a formal parameter x, with 1 representing $x^0$, 2 representing $x^1$, etc. The current register value is equal to the initial state raised to the power of the number of clock pulses since the initial state. Advantageously, the method of FIG. 5 is faster than simply stepping RAND through the update sequence of FIG. 4 because the number of updates is computed modulo the length of the RAND value sequence.

In a specific embodiment, the method of FIG. 5 can employ various operators whose implementations are known to those of skill in the art. Such operators include, e.g., multiple-precision division, which divides a 64-bit number by a 32-bit number, and modular exponentiation, which raises a polynomial to an integer power modulo a primitive polynomial. Advantageously, the modular exponentiation function can be computed in $\log_2(N)$ steps, as understood by those of skill in the art. Such operators advantageously serve to increase the speed of the algorithm.

As those of skill in the art would readily appreciate, any similar form of pseudorandom noise generator may be substituted for the maximal-length shift registers in the embodiments described herein. Further, while the embodiments described herein pertain to cellular telephone systems, and advantageously to CDMA systems, in which RANDC is constrained to be nonzero, it should be understood that RANDC need not be nonzero unless the particular system so specifies. Accordingly, depending upon the constraints of the system, either RANDC or RANDL, or both, could have an all-zeroes value inserted to extend the length of either or both of the sequences. Moreover, the cellular system broadcast challenge value of the embodiments described herein could equally well be any binary number that requires periodic updates such that the correlation between successive updates is minimized and the number of updates before which a repeat value occurs is maximized.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. A method of updating a broadcast challenge value transmitted by a cellular base station on a control channel, comprising the steps of:
   applying a first updating algorithm to a plurality of most significant bits of the broadcast challenge value; and
   operating on a plurality of least significant bits of the broadcast challenge value with a second updating algorithm to generate an updated broadcast challenge value.

2. The method of claim 1, wherein the applying step comprises applying a first maximal-length shift register algorithm.

3. The method of claim 1, wherein the applying step comprises applying a first pseudorandom noise generation algorithm.

4. The method of claim 1, wherein the operating step comprises operating on the plurality of least significant bits with a second maximal-length shift register algorithm.

5. The method of claim 1, wherein the operating step comprises operating on the plurality of least significant bits with a second pseudorandom noise generation algorithm.

6. The method of claim 1, wherein the applying step comprises applying a first updating algorithm that inserts an all-zeroes value as an update for the plurality of most significant bits once during the period of time necessary for the sequence of updates to produce a repeat value for the plurality of most significant bits.

7. The method of claim 1, wherein the operating step comprises operating on the plurality of least significant bits with a second updating algorithm that inserts an all-zeroes value as an update for the plurality of least significant bits once during the period of time necessary for the sequence of updates to produce a repeat value for the plurality of least significant bits.

8. The method of claim 1, wherein the applying step comprises applying a first updating algorithm that ensures that every update value for the plurality of most significant bits is a nonzero value.

9. The method of claim 1, wherein the operating step comprises operating on the plurality of least significant bits with a second updating algorithm that ensures that every update value for the plurality of least significant bits is a nonzero value.

10. In a cellular system, a method of synchronously updating binary numbers used by a plurality of base stations to authenticate a plurality of mobile subscriber units, the method comprising the steps of:
    applying a first updating algorithm to a plurality of most significant bits of the binary number for each of the plurality of base stations;
    operating on a plurality of least significant bits of the binary number for each of the plurality of base stations with a second updating algorithm; and
    synchronizing across the plurality of base stations update values of the binary numbers that result from the applying and operating steps.

11. The method of claim 10, wherein the synchronizing step is accomplished with a system-wide time reference available to the plurality of base stations.

12. The method of claim 11, wherein the system-wide time reference is GPS time.

13. The method of claim 11, wherein the applying step comprises applying a first maximal-length shift register algorithm.

14. The method of claim 11, wherein the applying step comprises applying a first pseudorandom noise generation algorithm.

15. The method of claim 11, wherein the operating step comprises operating on the plurality of least significant bits with a second maximal-length shift register algorithm.

16. The method of claim 11, wherein the operating step comprises operating on the plurality of least significant bits with a second pseudorandom noise generation algorithm.

17. The method of claim 11, wherein the applying step comprises applying a first updating algorithm that inserts an all-zeroes value as an update for the plurality of most significant bits once during the period of time necessary for the sequence of updates to produce a repeat value for the plurality of most significant bits.

18. The method of claim 11, wherein the operating step comprises operating on the plurality of least significant bits with a second updating algorithm that inserts an all-zeroes value as an update for the plurality of least significant bits once during the period of time necessary for the sequence of updates to produce a repeat value for the plurality of least significant bits.

19. The method of claim 11, wherein the applying step comprises applying a first updating algorithm that ensures that every update value for the plurality of most significant bits is a nonzero value.

20. The method of claim 11, wherein the operating step comprises operating on the plurality of least significant bits with a second updating algorithm that ensures that every update value for the plurality of least significant bits is a nonzero value.

21. A cellular base station, comprising:
    an integrated circuit capable of running software; and
    a set of software instructions executed by the integrated circuit for applying a first updating algorithm to a plurality of most significant bits of a binary number and for applying a second updating algorithm to a plurality of least significant bits of the binary number to generate an updated binary number.

22. The base station of claim 21, wherein the first updating algorithm comprises a first simulated maximal-length shift register algorithm.

23. The base station of claim 21, wherein the first updating algorithm comprises a first pseudorandom noise generation algorithm.

24. The base station of claim 21, wherein the second updating algorithm comprises a second simulated maximal-length shift register algorithm.

25. The base station of claim 21, wherein the second updating algorithm comprises a second pseudorandom noise generation algorithm.

26. The base station of claim 21, wherein the first updating algorithm inserts an all-zeroes value as an update for the plurality of most significant bits once during the period of time necessary for the sequence of updates to produce a repeat value for the plurality of most significant bits.

27. The base station of claim 21, wherein the second updating algorithm inserts an all-zeroes value as an update for the plurality of least significant bits once during the period of time necessary for the sequence of updates to produce a repeat value for the plurality of least significant bits.

28. The base station of claim 21, wherein the first updating algorithm ensures that every update value for the plurality of most significant bits is a nonzero value.

29. The base station of claim 21, wherein the second updating algorithm ensures that every update value for the plurality of least significant bits is a nonzero value.

30. A cellular system, comprising:
a system-wide time reference signal;
a plurality of mobile subscriber units; and
a plurality of base stations configured for wireless communication with the plurality of mobile subscriber units, each of the plurality of base stations comprising:
an integrated circuit capable of running software; and
a set of software instructions executed by the integrated circuit for applying a first updating algorithm to a plurality of most significant bits of a binary number and for applying a second updating algorithm to a plurality of least significant bits of the binary number, the binary number serving to authenticate any mobile subscriber unit requesting communication with a base station, and for synchronizing successive update values of the binary numbers with the system-wide time reference signal across the plurality of base stations.

31. The cellular system of claim 30, wherein the system-wide time reference signal conveys to each of the plurality of base stations a measure of GPS time.

32. The cellular system of claim 30, wherein the first updating algorithm comprises a first simulated maximal-length shift register algorithm.

33. The cellular system of claim 30, wherein the first updating algorithm comprises a first pseudorandom noise generation algorithm.

34. The cellular system of claim 30, wherein the second updating algorithm comprises a second simulated maximal-length shift register algorithm.

35. The cellular system of claim 30, wherein the second updating algorithm comprises a second pseudorandom noise generation algorithm.

36. The cellular system of claim 30, wherein the first updating algorithm inserts an all-zeroes value as an update for the plurality of most significant bits once during the period of time necessary for the sequence of updates to produce a repeat value for the plurality of most significant bits.

37. The cellular system of claim 30, wherein the second updating algorithm inserts an all-zeroes value as an update for the plurality of least significant bits once during the period of time necessary for the sequence of updates to produce a repeat value for the plurality of least significant bits.

38. The cellular system of claim 30, wherein the first updating algorithm ensures that every update value for the plurality of most significant bits is a nonzero value.

39. The cellular system of claim 30, wherein the second updating algorithm ensures that every update value for the plurality of least significant bits is a nonzero value.

40. A base station, comprising:
first means for updating a plurality of most significant bits of a broadcast challenge value; and
second means for updating a plurality of least significant bits of the broadcast challenge value to generate an updated binary number.

41. The base station of claim 40, wherein the first means for updating comprises a first simulated maximal-length shift register.

42. The base station of claim 40, wherein the first means for updating comprises a first pseudorandom noise generator.

43. The base station of claim 40, wherein the second means for updating comprises a second simulated maximal-length shift register.

44. The base station of claim 40, wherein the second means for updating comprises a second pseudorandom noise generator.

45. The base station of claim 40, wherein the first means for updating comprises inserting an all-zeroes value as an update for the plurality of most significant bits once during the period of time necessary for the sequence of updates to produce a repeat value for the plurality of most significant bits.

46. The base station of claim 40, wherein the second means for updating comprises inserting an all-zeroes value as an update for the plurality of least significant bits once during the period of time necessary for the sequence of updates to produce a repeat value for the plurality of least significant bits.

47. The base station of claim 40, wherein the first means for updating comprises ensuring that every update value for the plurality of most significant bits is a nonzero value.

48. The base station of claim 40, wherein the second means for updating comprises ensuring that every update value for the plurality of least significant bits is a nonzero value.

49. A cellular system, comprising:
means for establishing system-wide time synchronization;
a plurality of mobile subscriber units; and
a plurality of base stations configured for wireless communication with the plurality of mobile subscriber units, each of the plurality of base stations comprising:
first means for updating a plurality of most significant bits of a binary number, the binary number serving to authenticate any mobile subscriber unit requesting communication with a base station;
second means for updating a plurality of least significant bits of the binary number; and
means for synchronizing successive update values of the binary numbers across the plurality of base stations with the means for establishing system-wide time synchronization.

50. The cellular system of claim 49, wherein the means for establishing system-wide time synchronization conveys to each of the plurality of base stations a measure of GPS time.

51. The cellular system of claim 49, wherein the first means for updating comprises a first simulated maximal-length shift register.

52. The cellular system of claim 49, wherein the first means for updating comprises a first pseudorandom noise generator.

53. The cellular system of claim 49, wherein the second means for updating comprises a second simulated maximal-length shift register.

54. The cellular system of claim 49, wherein the second means for updating comprises a second pseudorandom noise generator.

55. The cellular system of claim 49, wherein the first means for updating inserts an all-zeroes value as an update for the plurality of most significant bits once during the period of time necessary for the sequence of updates to produce a repeat value for the plurality of most significant bits.

56. The cellular system of claim 49, wherein the second means for updating inserts an all-zeroes value as an update for the plurality of least significant bits once during the period of time necessary for the sequence of updates to produce a repeat value for the plurality of least significant bits.

57. The cellular system of claim 49, wherein the first means for updating ensures that every update value for the plurality of most significant bits is a nonzero value.

58. The cellular system of claim 49, wherein the second means for updating ensures that every update value for the plurality of least significant bits is a nonzero value.

* * * * *